Figure 1:
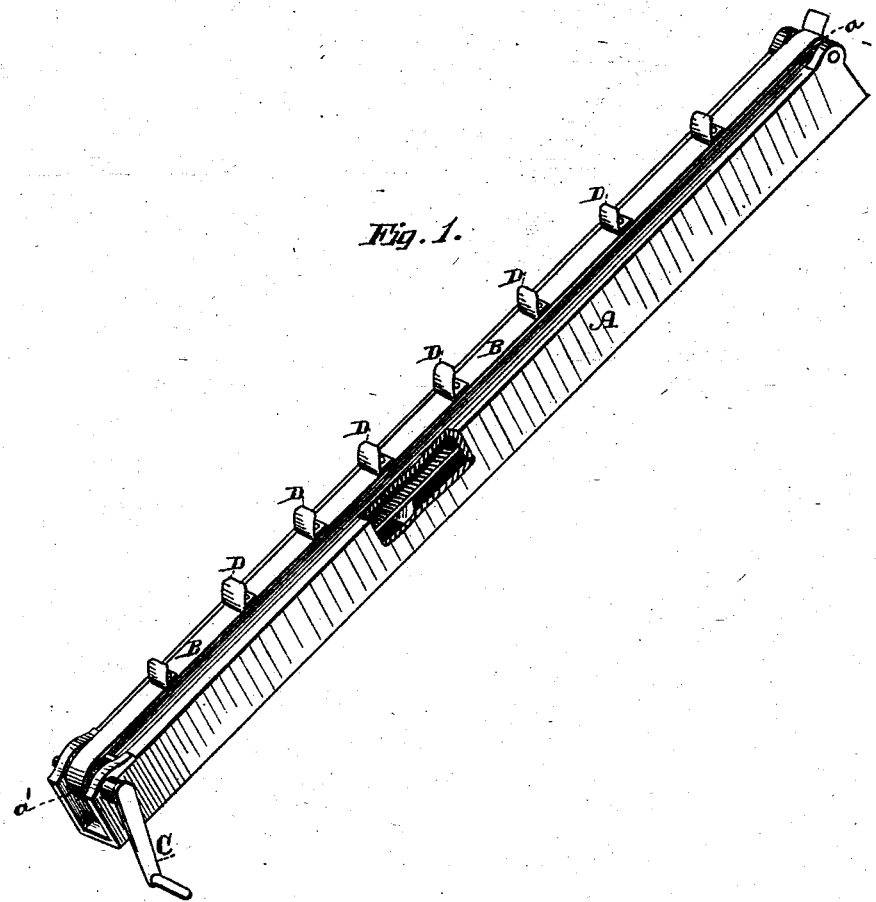

(No Model.)

L. STONE.
FRUIT GATHERER.

No. 259,940. Patented June 20, 1882.

Witnesses,
Geo. H. Strong
A H Strouse

Inventor
Leonard Stone
By Dewey & Co
Attorney

UNITED STATES PATENT OFFICE.

LEONARD STONE, OF SAN LUIS OBISPO, CALIFORNIA.

FRUIT-GATHERER.

SPECIFICATION forming part of Letters Patent No. 259,940, dated June 20, 1882.

Application filed March 27, 1882. (No model.)

*To all whom it may concern:*

Be it known that I, LEONARD STONE, of San Luis Obispo, county of San Luis Obispo, and State of California, have invented an Improved Fruit-Gatherer; and I hereby declare the following to be a full, clear, and exact description thereof.

My invention relates to an improvement in fruit-gatherers; and it consists of an endless traveling belt arranged to operate in connection with a frame or conveyer and having cutting devices; and, secondly, in details of construction substantially as hereinafter more fully set forth and claimed.

The object of my invention is to gather fruit from the trees, which is accomplished by the operation of the device, as I shall hereinafter fully describe.

Referring to the accompanying drawing, Figure 1 is a view of my device.

Let A represent a long box or tube made light enough to be serviceable. It is open at both ends, and is sufficiently large to accommodate whatever fruit is to be picked. This tube forms the directing-chute or conveyer, and is the frame upon which the endless belt travels.

Let B represent this belt. It passes over rollers $a$ and $a'$, journaled in the upper and lower ends of the tube A. The lower roller, $a'$, is provided with a crank, C, by the operation of which the belt is caused to travel over the rollers. It is adapted, as shown, to travel upward on the outside of the tube and downward upon the inside.

Upon the belt B, at desirable distances, are riveted or otherwise secured the cutters or gatherers D. These are made of strips of metal, one end of which is secured to the belt. They are then bent upward in a convex or similar form, as shown. These are placed over the whole extent of the belt, and are large enough to nearly close the conveyer when passing down, though they travel through it without friction.

In using the device I may have any kind of a stand, or, if light enough, may use it without one. I elevate the upper end of the conveyer into the tree, placing it just under or in convenient proximity to the fruit. By turning the crank the belt travels upward with its cutters, one of which, on account of the convex or semicircular shape, fits over the fruit, and its cutting-edge, being thus brought in contact with the stem, cuts it and severs the fruit. This, being embraced by the cutter or gatherer, is directed by it into the open end of the conveyer.

The advantage of having the cutters or conveyers close together over the extent of the belt is that the fruit, when directed into the conveyer, is prevented from falling through and being bruised upon the ground. Instead of this, it falls upon the top of the gatherer next below, and is let down by it to the bottom.

I am aware that in connection with cutting and gathering devices conveyers have been heretofore used.

I do not therefore claim a conveyer, broadly; but

What I do claim as new, and desire to secure by Letters Patent of the United States, is—

1. In a fruit-gatherer, the combination of an endless traveling belt, a frame or conveyer, and cutting devices, substantially as and for the purpose specified.

2. In a fruit-gatherer, an endless belt, a frame or tube, and convex cutters D, in combination, substantially as and for the purpose set forth.

3. A fruit-gatherer consisting of the tube or conveyer A, endless belt B, and the cutting and gathering devices D, secured upon said belt, in combination, substantially as set forth.

In witness whereof I hereto set my hand.

LEONARD STONE.

Witnesses:
JOHN H. HART,
F. ADAMS.